(12) United States Patent
Weber

(10) Patent No.: US 7,892,387 B2
(45) Date of Patent: Feb. 22, 2011

(54) PROCESS AND SYSTEM FOR APPLYING A COATING ONTO A SURFACE OF A LENS SUBSTRATE

(75) Inventor: Steven Weber, Clearwater, FL (US)

(73) Assignee: International Compagnie Generale d'Optique, Charenton-le-Pont (FR)

( * ) Notice: Subject to any disclaimer, the term of this patent is extended or adjusted under 35 U.S.C. 154(b) by 609 days.

(21) Appl. No.: 11/419,400

(22) Filed: May 19, 2006

(65) Prior Publication Data

US 2007/0270062 A1 Nov. 22, 2007

(51) Int. Cl.
*B32B 5/02* (2006.01)
*B32B 27/12* (2006.01)

(52) U.S. Cl. .................. 156/272.4; 156/285; 156/273.7; 156/196

(58) Field of Classification Search ............... 156/272.2, 156/272.4, 273.7, 284, 285, 196, 212, 228, 156/230
See application file for complete search history.

(56) References Cited

U.S. PATENT DOCUMENTS

| | | | | |
|---|---|---|---|---|
| 4,211,823 | A | 7/1980 | Suzuki et al. ............... | 428/412 |
| 4,962,000 | A * | 10/1990 | Emslander et al. .......... | 428/461 |
| 5,015,523 | A | 5/1991 | Kawashima et al. ........ | 428/336 |
| 5,316,791 | A | 5/1994 | Farber et al. ................ | 427/164 |
| 6,503,631 | B1 | 1/2003 | Faverolle et al. ............ | 428/447 |
| 6,562,466 | B2 | 5/2003 | Jiang et al. .................. | 428/412 |
| 6,734,409 | B1 * | 5/2004 | Wang et al. .................. | 219/759 |
| 6,740,699 | B2 | 5/2004 | Tardieu et al. .............. | 524/481 |
| 6,770,710 | B2 | 8/2004 | Robert et al. ............... | 524/832 |
| 2002/0128339 | A1 | 9/2002 | Maisonnier et al. .......... | 521/65 |
| 2003/0131931 | A1 * | 7/2003 | Murphy .................... | 156/272.2 |
| 2004/0194880 | A1 * | 10/2004 | Jiang et al. .................. | 156/285 |
| 2005/0123771 | A1 | 6/2005 | Vaneeckhoutte et al. .... | 428/426 |
| 2005/0140033 | A1 | 6/2005 | Jiang et al. .................. | 264/1.7 |
| 2006/0169407 | A1 | 8/2006 | Jiang ....................... | 156/308.6 |
| 2006/0219347 | A1 | 10/2006 | Begon et al. .................. | 156/99 |

FOREIGN PATENT DOCUMENTS

| | | |
|---|---|---|
| EP | 0040111 | 9/1984 |
| EP | 0614957 | 9/1997 |
| EP | 1161512 | 2/2004 |
| JP | 63-141001 | 6/1988 |
| JP | 63-087223 | 8/1988 |
| WO | WO 94/10230 | 5/1994 |
| WO | WO 03/004255 | 1/2003 |

OTHER PUBLICATIONS

U.S. Appl. No. 11/203,870, filed Aug. 15, 2005, Jiang et al.
U.S. Appl. No. 11/204,267, filed Aug. 15, 2005, Galcet et al.

* cited by examiner

*Primary Examiner*—John L Goff
*Assistant Examiner*—Daniel McNally
(74) *Attorney, Agent, or Firm*—Fulbright & Jaworski L.L.P.

(57) ABSTRACT

A process for applying under pressure a coated or uncoated film onto a main surface of a lens substrate using a heat activable adhesive layer formed between a face of the coated or uncoated film and the main surface of the lens substrate, said process comprising a heating step to achieve adhesion of the coated or uncoated film to the lens substrate main surface which comprises applying a microwave energy to a microwave heatable material situated in the vicinity of the heat activable adhesive layer so that the heat activable adhesive layer is only heated by conduction of the heat generated by the microwave heatable material.

8 Claims, 5 Drawing Sheets

PROCESS AND SYSTEM FOR APPLYING A COATING ONTO A SURFACE OF A LENS SUBSTRATE

BACKGROUND OF THE INVENTION

1. Field of the Invention

The present invention relates to an improved process or method for applying a coated or uncoated film onto at least one main surface of a lens substrate which can be implemented in a short period of time without any risk of deformation of the lens substrate and which allows a localized and controlled heating during implementation of the process.

The invention also relates to a coated film and a system for implementing the substrate coating process.

2. Description of Related Art

It is a common practice in the art to coat at least one main surface of a lens substrate, such as an ophthalmic lens or lens blank, with several coatings for imparting to the finished lens additional or improved optical and/or mechanical properties.

Thus, it is usual practice to coat at least one main surface of a lens substrate, typically made of an organic glass material, with successively, starting from the surface of the lens substrate, an impact-resistant coating (impact resistant primer), an abrasion and/or scratch-resistant coating (hard coat), an anti-reflecting coating and, optionally, a hydrophobic top coat. Other coatings such as a polarized coating, a photochromic or a dying coating may also be applied onto one or both surfaces of the lens substrate.

Numerous processes and methods have been proposed for coating a surface of an ophthalmic lens and are disclosed.

U.S. Pat. No. 6,562,466 describes one process or method for transferring a coating from at least one mold part onto at least a geometrically defined surface of a lens blank comprising:

providing a lens blank having at least one geometrically defined surface;
providing a support or mold part having an internal surface bearing a coating and an external surface;
depositing on said geometrically defined surface of said lens blank or on said coating a pre-measured amount of a curable adhesive composition;
moving relatively to each other the lens blank and the support to either bring the coating into contact with curable adhesive composition or bring the curable adhesive composition into contact with the geometrically defined surface of the lens blank;
applying a sufficient pressure onto the external surface of the support so that the thickness of a final cured adhesive layer is less than 100 micrometers;
curing the layer of adhesive composition; and
withdrawing the support or mold part to recover the lens blank with the coating adhered onto the geometrically defined surface of said lens blank.

In the process of U.S. Pat. No. 6,562,466, a light or thermal curing adhesive is used to transfer the coating layers from the support to the surface of the lens substrate. The adhesive is required to stick both to the exposed film on the support and the surface of the lens substrate.

U.S. patent application Ser. No. 11/048,136 filed on Feb. 1, 2005 in the name of ESSILOR INTERNATIONAL (COMPAGNIE GENERALE D'OPTIQUE), hereby incorporated by reference, discloses a process for applying a coated or uncoated film onto at least one main surface of a lens substrate which comprises the steps of:

(a) providing a lens substrate having main surfaces;
(b) providing a coated or uncoated film;
(c) forming, on either face of the coated or uncoated film or one of the said main surfaces of the lens substrate, a layer of a dry latex;
(d) depositing at least one drop of a water base activating liquid on either one of the said main surfaces of the lens substrate, a face of the coated or uncoated film or an exposed surface of the dry latex layer;
(e) moving relatively to each other the coated or uncoated film and the lens substrate and applying a sufficient force to the coated or uncoated film to spread the water base activating liquid and form a thin pellicle of the water base activating liquid between the dry latex layer and either the lens substrate or the coated or uncoated film;
(f) heating the thin pellicle of water base activating liquid and the dry latex layer;
(g) releasing the applied force; and
(h) recovering the lens substrate with the coated or uncoated film adhered to the lens substrate main surface.

Preferably, heating step (f) is performed at a temperature higher than the "tacky" temperature of the dry latex layer. The "tacky" temperature is the temperature at which the dry latex layer becomes sticky.

Typically, heating step (f) is performed at a temperature ranging from 40° C. to 130° C., preferably 50° C. to 120° C.

In U.S. patent application Ser. No. 11/048,136 heating source can be an air oven, a hot water bath, an IR source or a microwave source. However, this document does not give any information about microwave heating and how one could obtain a controlled heating essentially localized only in the area of the coated or uncoated film and the lens substrate, in particular when using an inflatable membrane apparatus for implementing the process.

Inflatable membrane apparatuses for implementation of coating application are disclosed in particular in published International Patent Application WO 03/004255 and in U.S. patent application Ser. No. 11/203,870 filed on 15 Aug. 2005 in the name of ESSILOR INTERNATIONAL (COMPAGNIE GENERALE D'OPTIQUE), both incorporated by reference.

The heating step is in fact commonly performed by placing the entire system including the pressing apparatus, the film, the heat activable adhesive layer and the lens substrate into a conventional convection oven and heating lasts about 30 minutes at a temperature typically set at about 110° C.

These heating procedures have the drawbacks of being energy consuming, because the entire system is heated, and necessitates long heating time to complete the process, for example about 30 minutes when using a dry latex layer and a water base activating liquid as the heat activable adhesive layer Infrared heating has also been attempted. When using an inflatable membrane apparatus, if the infrared emitter is external to the accumulator, the IR radiation must pass through a quartz window and the membrane before impinging the film and the lens substrate which results in significant absorption of the IR radiation and inefficient heating leading to a poor film or coating adhesion. If the IR emitter is located within the accumulator, there is a high risk that the IR radiation will be too strong, resulting in a quick cracking and crazing of the coating. Furthermore, deflation of the membrane, especially when pressure is rapidly released, will likely damage or destroy the IR emitter.

SUMMARY OF THE INVENTION

Therefore, a first object of the invention is to provide a process for applying under pressure, in particular by means of an inflatable membrane pressing apparatus, a coated or uncoated film onto a main surface of a lens substrate using a heat activable adhesive layer formed between a face of the coated or uncoated film and the main surface of the lens substrate, said process comprising a heating step to achieve adhesion of the coated or uncoated film to the lens substrate main surface which consists in applying a microwave energy to a microwave heatable material situated in the vicinity of the heat activable adhesive layer so that the heat activable adhesive layer is only heated by conduction of the heat generated by the microwave heatable material.

A further object of the invention is to provide a process as above which allows a short and localized heating step to complete the application process.

A still further object of the invention is to provide a system for implementing the above process.

Another object of the invention is to provide a coated or uncoated film for use in the above process and also acts as the microwave heatable material.

The above objects are achieved according to the invention by providing a process for applying under pressure a coated or uncoated film onto a main surface of a lens substrate which comprises:
(a) providing a coated or uncoated film;
(b) providing a lens substrate;
(c) forming between a face of the coated or uncoated film and a main surface of the lens substrate a layer of a heat activable adhesive;
(d) applying a force on the coated or uncoated film to urge the coated or uncoated film against the lens substrate main surface, with the heat activable adhesive layer therebetween and to conform the coated or uncoated film to the shape of the lens substrate main surface;
(e) while maintaining the applied force on the coated or uncoated film, heating the heat activable material to achieve adhesion between the coated or uncoated film and the lens substrate main surface;
(f) stopping heating and releasing the applied force; and
(g) recovering the lens substrate with the coated or uncoated film adhered thereon;
wherein, heating step (e) consists in applying a microwave energy to a microwave heatable material situated in the vicinity of the heat activable adhesive layer so that the heat activable adhesive layer is essentially heated by conduction of the heat generated within the microwave heatable material.

By "essentially heated by conduction of the heat generated by the microwave heatable material" it is meant that at least 90%, preferably at least 95% and better at least 99% of the heat generated in the heat activable material result from conduction of the heat generated within the microwave heatable material.

In a preferred embodiment, the coated or uncoated film is a coated film comprising a flexible carrier having one face bearing a coating or a stack of coatings and the process further comprises the step of peeling off the carrier to recover the lens substrate with the coating or stack of coatings adhered thereon.

The microwave heatable material can be any material that heats when subjected to a microwave energy. It can be a liquid such as ethylene glycol, water, silicone oil, glycerin, propylene glycol, a metal or alloy such as silver and aluminium (in a thin semi-transparent layer) or an electrically conductive (co)polymer such as polyaniline or activated carbon. When a microwave heatable liquid material is used, it is preferably used together with an inflatable membrane pressing apparatus, and the microwave heatable liquid material is in contact with the inflatable membrane.

When the microwave heatable material is a metal or alloy or an electrically conductive (co)polymer, it may be in the form of a coating deposited on at least one surface of a part of a pressing apparatus which comes into contact with the coated or uncoated film during the process, such as a surface of an inflatable membrane of an inflatable membrane pressing apparatus, or in the form of a flexible insert in contact with a surface of a part of a pressing apparatus coming into contact with the coated or uncoated film during the process or coming into contact with the coated or uncoated film.

When the microwave heatable material is in the form of a coating deposited on at least one surface of an inflatable membrane it may be deposited on either one or both surfaces of the inflatable membrane, but preferably on the internal surface of the membrane, i.e. the surface of the inflatable membrane which is the farthest from the lens substrate during the application process. (Of course, the external surface of the inflatable membrane is the surface which is the closest to the lens substrate during the application process).

The flexible insert can be made entirely of the microwave heatable material or it can be a composite insert comprising a flexible carrier, preferably made of a plastic material such as polycarbonate, which is coated on at least one of its faces with a microwave heatable material. Such an insert may be placed in close contact of a part of the pressing apparatus, for example the internal surface of the inflatable membrane of an inflatable membrane apparatus, or directly in contact with the coated or uncoated film.

In a preferred embodiment, the coated or uncoated film is a coated film comprising a flexible carrier having one face bearing a coating or a stack of coatings and the other opposite face is coated with a layer of a microwave heatable material.

When used as a coating, the microwave heatable material typically forms a layer of a thickness ranging from 1 nm to 0.5 mm, preferably 0.05 to 0.3 mm.

When used as a flexible insert entirely made of the microwave heatable material, the insert has a thickness ranging generally from 0.5 to 2 mm.

Of course, whether in the form of a liquid, a coating or an insert, the microwave heatable material preferably extends over the entire main surface of the lens substrate so that uniform heating over the entire surface of the main substrate is obtained.

The heat activable adhesive can be any adhesive that, after being heated, results in a safe bonding of the coated or uncoated film (or of a coating or stack of coatings born by a carrier) to the lens substrate.

A first family of heat activable adhesives comprises heat curable polymer adhesive compositions.

A second preferred family of heat activable adhesives comprises a dry latex layer wetted by a water base activating liquid.

Therefore in a preferred embodiment of the invention there is provided a process for applying a coated or uncoated film onto at least one main surface of a lens substrate which comprises the steps of
(a) providing a coated or uncoated film;
(b) providing a lens substrate;
(c) forming on a face of the coated or uncoated film or on a main surface of the lens substrate a layer of a dry latex;
(d) depositing at least one drop of a water base activating liquid on either a main surface of the lens substrate, a face of the coated or uncoated film or an exposed surface of the dry latex layer;
(e) applying a force on the coated or uncoated film to urge the coated or uncoated film against the main surface of the lens substrate and conform it to the shape of the lens substrate, while forming a thin pellicle of the water base activating liquid between the dry latex layer and either the lens substrate main surface or the coated or uncoated film;

(f) while maintaining the applied force, heating the dry latex layer and the thin pellicle of water base activating liquid;

(g) stopping heating and releasing the applied force, and;

(h) recovering the lens substrate with the coated or uncoated film adhered thereon;

Wherein, heating step (f) includes applying a microwave energy to a microwave heatable material situated in the vicinity of the dry latex layer and the thin pellicle of water base activating liquid so that the dry latex layer and the thin pellicle of water base activating liquid are essentially heated by conduction of the heat generated within the microwave heatable material.

Heating of the heat activable adhesive typically ranges from 40 to 130° C., preferably from 60 to 120° C., more preferably from 80 to 110° C.

The applied force may be obtained by applying pressure, in particular air pressure or vacuum to the film. Typically, the applied pressure ranges from 0.35 to 3.5 kg/cm$^2$. (5 to 50 psig).

In one embodiment of the process, the film is a coated film preferably comprising a carrier, in particular a flexible carrier, having one surface bearing at least one coating or a stack of coatings and the process further comprises withdrawing the carrier, whereby the coating or the stack of coatings is transferred from the carrier on the main surface of the lens substrate. In that embodiment the heat curable polymer adhesive or the dry latex layer is placed on the coating or stack of coatings or on the main surface of the lens substrate, preferably on the coating or coating stack of the carrier. Of course, when the carrier is coated with a stack of coatings, the coatings are applied on the surface of the carrier in the reverse order with regard to the desired order of the coating stack on the lens substrate.

In another embodiment, the film is an uncoated film, such as a polarizing film, a colored film, a photochromic film or a combination of such films. In that embodiment heat curable adhesive or the dry latex layer is formed either on one surface of the film or on a main surface of the lens substrate, or on both sides of the uncoated film surface and the main surface of the lens substrate.

In a still further embodiment, the film is a coated film comprising a carrier, preferably a flexible carrier, having one surface coated with a coating or a stack of coatings, the carrier being intended to remain on the lens substrate after completion of the application process. The flexible carrier may be a polarizing film, a colored film, a photochromic film or a combination thereof. In that latter embodiment, heat curable adhesive or the dry latex layer may be applied on the uncoated surface of the flexible carrier or on a main surface of the lens substrate.

Preferably, the coated or uncoated film is applied on the rear surface (generally the concave surface) of the lens substrate, i.e. the surface of the lens substrate which, in use, is the closest to the wearer's eye, except when the film is an uncoated film, in particular a polarized film, where it is preferably applied on the front surface (generally the convex surface) of the lens substrate, i.e. the surface of the lens substrate which, in use, is the farthest form the wearer's eye.

Of course, rear and front surfaces of the lens substrate can be both coated using the process of the invention.

The rear or front surface to be coated in this invention could be a sphere, toric or progressive curve by using adequate sphere flexible carrier.

The present invention also encompasses the case where heat curable adhesive (possibly partially pre-cured) or the latex layer is pre-deposited on a coated or uncoated film which may be stored and later used in the process of the invention.

The invention also concerns a system comprising:

(a) an inflatable membrane pressing apparatus for a film or coating application or lamination process, said inflatable membrane apparatus comprising:

a support for supporting a lens substrate;

a pressurized fluid accumulator having opposite bottom and top walls, the bottom wall being partly formed by an inflatable membrane;

a holding frame for holding the support and the pressurized fluid accumulator in space apart relationship and with the inflatable membrane facing the support;

a pressurized fluid admission/release means for introducing and releasing pressurized fluid in and from the accumulator to inflate and deflate the membrane; and (b) a microwave energy producing device;

(c) said system further comprising a microwave heatable material in the form of a microwave heatable liquid in contact with the membrane, a coating formed on at least one surface of the inflatable membrane, an insert in contact with an internal surface of the inflatable membrane or disposed below the inflatable membrane or a coating formed on an uncoated face of a coated or uncoated film disposed below the inflatable membrane.

The microwave energy producing device can be a microwave oven in which the entire system is placed. Of course, the support, the pressurized fluid accumulator and the holding frame of the inflatable membrane apparatus are then made of materials that are not heatable by the microwave energy.

In a preferred embodiment, the top wall of the pressurized fluid accumulator comprises a microwave transparent window in register with the inflatable membrane and the microwave energy producing device comprises a waveguide coupled with the microwave transparent window and a microwave source.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings wherein.

DETAILED DESCRIPTION OF THE INVENTION AND PREFERRED EMBODIMENTS

Figure 1A:
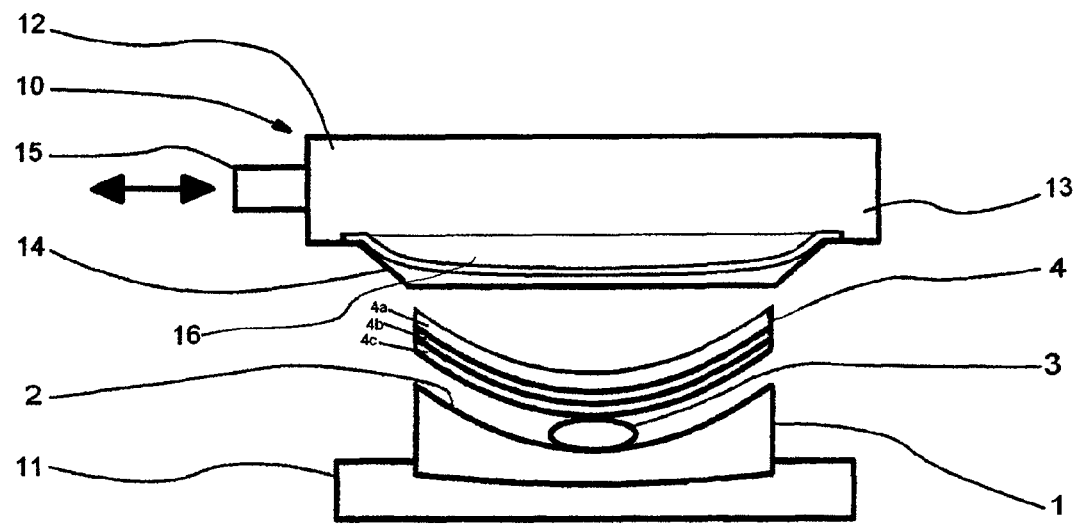
FIGS. 1A and 1B are schematic views of the main steps of an embodiment of the process of the invention, using an inflatable membrane apparatus.

In this patent application, when one refers to the base curvature of the carrier, one means the base curvature of the working surface of the carrier, that is to say the surface which is going to adhere to the lens substrate or which bears the coatings to be transferred to the lens substrate, after withdrawal of the carrier.

In the same way, base curvature of the lens substrate means the base curvature of the surface to which the carrier is going to adhere or which bears the coatings that are going to be transferred.

In this application, the base curvature has the following definition:

For a spheric surface, having a radius of curvature R, base curvature (or base)=530/R (R in mm).

Such a definition is quite classical in the art.

For a toric surface, there are two radii of curvature, and one calculates, according to the above formula, two base curvatures BR, Br with BR<Br.

The lens substrate is generally a lens or lens blank, preferably an ophthalmic lens or lens blank.

The substrate is preferably a lens blank.

The lens substrate may be polished or only fined without being polished.

Preferably, the main surface of the lens substrate onto which the coated or uncoated film is applied, is a geometrically defined surface.

The main surface of the lens substrate (preferably the rear (concave) surface) on which the film is to be applied or coatings to be transferred may be a spheric, toric or progressive surface.

By geometrically defined surface of the lens substrate, there is meant either an optical surface, that is a surface of required geometry and smoothness or a surface having a required geometry but that may still exhibit some roughness, such as a lens blank that has been grinded and fined, but not polished to the required geometry. The surface roughness typically ranges from Sq $10^{-3}$ μm to 1 μm, preferably from $10^{-3}$ to 0.5 μm and most preferably from $10^{-3}$ to 0.1 μM.

$$Sq = \sqrt{\frac{1}{NM}\sum_{x=1}^{N}\sum_{y=1}^{M} Zx, y^2}$$

Computes the efficient value for the amplitudes of the surfaces (RMS). This parameter is included in the EUR 15178 EN report (Commission of the European Communities) Stout et al. 1993: The development of methods for the characterization of roughness in three dimensions.

The roughness ($S_q$) was measured by P-10 long scan of KLA-tencor.

The measurement condition was under 2 μm tip 1 mg force 10 scans 500 μm long 2000 data points.

The state of the surface of a lens being fined without being polished can also be expressed in terms of Rq.

Preferably, such a lens substrate has a Rq which ranges from 0.01 micron to 1.5 microns, preferably from 0.05 to 1.5 microns; more preferably from 0.1 to 1 micron.

Rq is determined as follows:

A TAYLOR HOBSON FTS (Form Talysurf Series 2) profilometer/roughness measuring systems is advantageously used to determined the root-mean-square profile height Rq (2DRq) of the surface (also referred as roughness Rq before).

The system includes a laser head (product reference 112/2033-541, for example) and a 70 mm long feeler (product reference 112/1836) having a 2 mm radius spherical/conical head.

The system measures a two-dimensional profile in the chosen section plane to obtain a curve Z=f(x). In this example the profile is acquired over a distance of 20 mm.

Various surface characteristics can be extracted from this profile, in particular its shape, undulation and roughness.

Accordingly, to determine Rq, the profile is subject to two different processes, namely shape extraction and filtering, which corresponds to mean line extraction.

The various steps for determining a parameter Rq of this kind are as follows:

acquisition of the profile Z=f(x),
shape extraction,
filtering (mean line extraction), and
determination of parameter $R_q$.

The profile acquisition step consists in moving the stylus of the aforementioned system over the surface of the lens in question, to store the altitudes Z of the surface as a function of the displacement x.

In the shape extraction step, the profile obtained in the previous step is related to an ideal sphere, i.e. a sphere with minimum profile differences relative to that sphere. The mode chosen here is the LS arc mode (best circular arc extraction).

This provides a curve representative of the characteristics of the profile of the surface in terms of undulation and roughness.

The filtering step retains only defects corresponding to certain wavelengths. In this example, the aim is to exclude undulations, a form of defect with wavelengths higher than the wavelengths of defects due to roughness. Here the filter is of the Gaussian type and the cut-off used is 0.25 mm.

Rq is determined from the curve obtained using the following equation:

Where Zn is, for each point, the algebraic difference Z relative to the mean line calculated during filtering.

Although the lens substrate can be made of mineral glasses or organic glasses, it is preferably made of organic glasses.

The organic glasses can be either thermoplastic materials such as polycarbonates and thermoplastic polyurethanes or thermosetting (cross linked) materials such as diethyleneglycol bis allylcarbonate polymers and copolymers (in particular CR 39® PPG), thermosetting polyurethanes, polythiourethanes, polyepoxides, polyepisulfides, poly(meth)acrylates, polythio(meth)acrylates, as well as copolymers and blends thereof.

Preferred materials for the lens substrate are polycarbonates and diethylene glycol bis allyl carbonate copolymers, in particular substrates made of polycarbonate.

The main surface of the lens substrate to be coated is preferably pretreated to promote adhesion of the heat curable adhesive or the dry latex layer.

Any physical or chemical adhesion promoting pretreatment step can be used such as a solvent treatment, a NaOH treatment or a corona discharge treatment. Preferably the lens substrate main surface to be coated is pretreated by corona discharge.

The heat curable adhesive may be any heat curable adhesive that will achieve, under heat application, adhesion of the coated or uncoated film or of a coating borne by this film to the main surface of the lens substrate without impairing the optical properties of the finished lens.

Some additives such as photochromic dyes and/or pigments may be included in the adhesive.

The heat curable adhesive in liquid form may be dispensed as at least one drop at the center, as a random pattern of drops, spread out by spin coating or spread using a precision dispensing valve.

The heat curable adhesive can be a polyurethane composition, an epoxy composition, a (meth)acrylate composition such as a polyethyleneglycol di(meth)acrylate or an ethoxylated bisphenol A di(meth)acrylate composition.

The preferred adhesive compositions are acrylate compositions such as polyethyleneglycoldiacrylate and ethoxylated bisphenol A diacrylate compositions, various trifunctional acrylates compositions such as (ethoxylated) trimethylolpropane triacrylate and tris(2-hydroxyethyl) isocyanurate compositions.

Monofunctional acrylate compositions such as isobornylate, benzacrylate, phenylthioethylacrylate compositions, are also suitable.

The above compositions can be used alone or in combination.

Usually, the thickness of the final heat curable adhesive layer after curing is less than 100 µm, preferably less than 80 µm, better less than 50 µm and typically 1 to 30 µm.

The dry latex layer may be formed by applying a liquid latex on either the coated or uncoated surface of a coated film, a surface of an uncoated film or a main surface of the lens substrate. Application can be performed by any usual process such a dip coating, flow coating or spin coating. Thereafter, the deposited liquid latex layer is dried by heating. Usually, heating will be performed at a temperature ranging from 40° C. to 130° C. and will be preferably pursued until at least a tack free layer is obtained. Typically heating will last from 60° to 100° C. for 15 seconds to 90 seconds.

Preferred latexes are (meth)acrylic latexes such as the acrylic latex commercialized under the name Acrylic latex A-639 by Zeneca, polyurethane latexes such as the latexes commercialized under the names W-213, W-240 and W-234 by Baxenden and polyester latexes. Preferred latexes are polyurethane latexes.

Other preferred latexes are core/shell latexes such as those described in Essilor U.S. Pat. No. 6,503,631 and especially latexes based on alkyl(meth)acrylates such as butylacrylate or butyl(meth)acrylate.

In a preferred embodiment, the latex layer may also include an effective amount of a coupling agent (as defined hereinafter) in order to promote adhesion of the latex layer with the substrate and/or the coated or uncoated film, in particular an abrasion and/or scratch-resistant coating of a coated film.

The latexes may also comprise a classical dye or a photochromic dye.

Latexes comprising a photochromic dye and the method for obtaining them are disclosed for example in the following Essilor patents: EP 1161512; U.S. Pat. Nos. 6,770,710; 6,740,699.

Generally, after drying and curing the latex layer has a thickness ranging from 0.05 to 30 µm, preferably from 0.5 to 20 µm and better from 0.6 to 15 µm.

The latex layer may preferably constitute an impact-resistant primer coating of the coated lens substrate.

Then the latex preferably fulfills the preferred requirements of impact resistant primer coating such as Tg of the latex layer being less than 30° C.

Cured latexes, in particular polyurethane latex, having a low glass transition temperature Tg are preferred since they result in a better transfer and a better adhesion. Thus, the dry latex layer preferably has a Tg lower than 0° C., more preferably lower than −10° C., better lower than −20° C. and even better lower than −40° C.

Also, latexes having low "tacky" temperatures are preferred. Thus, preferred latexes have "tacky" temperatures≦80° C., generally ranging from 40° C. to 80° C. preferably from 50° C. to 75° C.

By "activating liquid" there is meant a liquid which, when contacting the dry latex layer under the processing conditions, in particular under heating, imparts to the dry latex layer adhesive properties.

The water base activating liquid may be water, preferably dionized water, or a mixture of water and one or more classical organic solvents such as alkanols, typically $C_1$-$C_6$ alkanols such as for example methanol or ethanol. Preferably there is no organic solvent.

The water base activating liquid can also be a latex, preferably a mixture of an aqueous solvent and of a latex, such as preferably a polyurethane latex. In preferred embodiments, the latex used as a water base activating liquid has a maximum dry extract of 20% by weight and better of maximum of 15% by weight.

The latexes used for the water base activating liquid are preferably the same as the latexes used for making the dry latex layer.

Typically there is deposited at least one drop of water base activating liquid at the center of the main surface of the lens substrate itself or on the dry latex layer when it is formed on the lens substrate main surface. Of course, a random pattern of several drops of water base activating liquid can also be used.

The amount of water base activating liquid must be sufficient to form a continuous thin pellicule over, preferably, the entire dry latex layer during the application process.

As indicated above the applied film may be a coated or uncoated film.

When the applied film is a coated film, it comprises a carrier, preferably a flexible carrier, having one surface coated with a coating or a stack of coatings, generally classical functional coatings.

The flexible carrier may be a removable carrier, i.e. a carrier that is intended to be removed at the end of the application process, so that only the coating or stack of coatings is transferred to the lens substrate main surface after completion of the process.

Preferred removable carrier may be a thin supporting element made of a plastic material especially a thermoplastic material and in particular of polycarbonate. Generally, such a removable carrier has a thickness ranging from 0.2 to 5 mm, preferably from 0.5 to 2 mm.

When a removable carrier is used, heat curable adhesive is deposited or the dry latex layer is formed either on the coating or stack of coatings borne by the carrier, or on the lens substrate main surface.

The carrier, preferably a flexible carrier, of the coated film may also be a permanent carrier, i.e. which remains on the final lenses or a semi-permanent carrier, i.e. which remains on the coated lens substrate at the completion of the present process but can be eliminated later, if needed. Examples of permanent carriers are polarizing films, colored or photochromic films, optical-electronical films, electric-photochromic films, or printed films, microstructured or logo film. The thickness of the film could be from 0.3 to 1.5 mm.

When permanent or semi-permanent carriers are used, the heat curable adhesive may also be deposited or the dry latex layer may also be formed on the uncoated surface of the flexible carrier.

Usual functional coatings, as is well known, comprise hydrophobic top coats, anti-reflecting coatings, anti-abrasion and/or scratch-resistant coatings, impact-resistant coatings, polarized coatings, photochromic coatings, dyed coatings, printed layers.

Preferably, the coated film comprises a stack of coating layers including a hydrophobic top coat layer, an anti-reflective coating (AR coating) layer, a scratch and/or abrasion resistant coating (hardcoat) layer, and optionally an impact-resistant coating layer (which can be the latex layer itself), these layers being deposited in this indicated order (reverse from the final order on the optical article) when the carrier is a removable carrier or is intended to be the outermost layer of the coated lens substrate or final optical article.

Of course, if the carrier is intended to be an intermediate layer between the lens substrate and the stack of coatings, the coating layers are deposited on one surface of the carrier in the order they shall achieve in the final product (in fact the reverse of the above indicated order).

The hydrophobic top coat, which in the finished optical article constitutes the outermost coating on the lens substrate, is intended for improving dirty mark resistance of the finished optical article and in particular of the anti-reflecting coating.

As known in the art, a hydrophobic top coat is a layer wherein the stationary contact angle to deionized water is at least 60°, preferably at least 75° and more preferably at least 90°, and even better more than 100°.

The stationary contact angle is determined according to the liquid drop method in which a water drop having a diameter smaller than 2 mm is formed on the optical article and the contact angle is measured.

The hydrophobic top coats preferably used in this invention are those which have a surface energy of less than 14 m Joules/m$^2$.

The invention has a particular interest when using hydrophobic top coats having a surface energy of less than 13 m Joules/m$^2$ and even better less than 12 m Joules/m$^2$.

The surface energy values referred just above are calculated according to Owens Wendt method described in the following document: "Estimation of the surface force energy of polymers" Owens D. K.—Wendt R. G. (1969) J. Appl. Polym. Sci., 1741-1747.

Such hydrophobic top coats are well known in the art and are usually made of fluorosilicones or fluorosilazanes i.e. silicones or silazanes bearing fluor-containing groups. Example of a preferred hydrophobic top coat material is the product commercialized by Shin Etsu under the name KP 801M.

The top coat may be deposited onto the carrier using any typical deposition process, but preferably using thermal evaporation technique.

Thickness of the hydrophobic top coat usually ranges from 1 to 30 nm, preferably 1 to 15 nm.

Anti-reflecting coatings and their methods of making are well known in the art. The anti-reflecting can be any layer or stack of layers which improves the anti-reflective properties of the finished optical article.

The anti-reflecting coating may preferably consist of a mono- or multilayer film of dielectric materials such as SiO, SiO$_2$Si$_3$N$_4$, TiO$_2$, ZrO$_2$, Al$_2$O$_3$, MgF$_2$ or Ta$_2$O$_5$, or mixtures thereof.

The anti-reflecting coating can be applied in particular by vacuum deposition according to one of the following techniques:
 1)—by evaporation, optionally ion beam-assisted;
 2)—by spraying using an ion beam,
 3)—by cathode sputtering; or
 4)—by plasma-assisted vapor-phase chemical deposition.

In case where the film includes a single layer, its optical thickness must be equal to $\lambda/4$ where $\lambda$ wavelength of 450 to 650 nm is.

Preferably, the anti-reflecting coating is a multilayer film comprising three or more dielectric material layers of alternatively high and low refractive indexes.

Of course, the dielectric layers of the multilayer anti-reflecting coating are deposited on the optical surface of the mold part or the hydrophobic top coat in the reverse order they should be present on the finished optical article.

A preferred anti-reflecting coating may comprises a stack of four layers formed by vacuum deposition, for example a first SiO$_2$ layer 21 having an optical thickness of about 100 to 160 nm, a second ZrO$_2$ layer 22 having an optical thickness of about 120 to 190 nm, a third SiO$_2$ layer 23 having an optical thickness of about 20 to 40 nm and a fourth ZrO$_2$ layer 24 having an optical thickness of about 35 to 75 nm.

Preferably, after deposition of the four-layer anti-reflecting stack, a thin layer of SiO$_2$ of 1 to 50 nm thick (physical thickness) may be deposited. This layer promotes the adhesion between the anti-reflecting stack and the abrasion and/or scratch-resistant coating generally subsequently deposited, and is not optically active.

The next layer to be deposited is the abrasion and/or scratch-resistant coating. Any known optical abrasion and/or scratch-resistant coating composition can be used to form the abrasion and/or scratch-resistant coating. Thus, the abrasion and/or scratch-resistant coating composition can be a UV and/or a thermal curable composition.

By definition, an abrasion and/or scratch-resistant coating is a coating which improves the abrasion and/or scratch-resistant of the finished optical article as compared to a same optical article but without the abrasion and/or scratch-resistant coating.

Preferred abrasion and/or scratch-resistant coatings are those made by curing a precursor composition including epoxyalkoxysilanes or a hydrolyzate thereof, optionally colloidal mineral fillers and a curing catalyst. Examples of such compositions are disclosed in U.S. Pat. No. 4,211,823, WO 94/10230, U.S. Pat. No. 5,015,523, EP 614957.

The most preferred abrasion and/or scratch-resistant coating compositions are those comprising as the main constituents an epoxyalkoxysilane such as, for example, γ-glycidoxypropyltrimethoxysilane (GLYMO) and a dialkyldialkoxysilane such as, for example dimethyldiethoxysilane (DMDES), colloidal silica and a catalytic amount of a curing catalyst such as aluminum acetylacetonate or a hydrolyzate thereof, the remaining of the composition being essentially comprised of solvents typically used for formulating these compositions.

In order to improve the adhesion of the abrasion and/or scratch-resistant coating to the impact-resistant primer coating to be subsequently deposited or to the latex layer, an effective amount of at least one coupling agent can be added to the abrasion and/or scratch-resistant coating composition.

The preferred coupling agent is a pre-condensed solution of an epoxyalkoxysilane and an unsaturated alkoxysilane, preferably comprising a terminal ethylenic double bond.

Examples of epoxyalkoxysilanes are:
 γ-(glycidoxypropyl) trimethoxysilane,
 γ-(glycidoxypropyl)pentamethyld isiloxane,
 γ-(glycidoxypropyl)methyidiisopropenoxysilane,
 γ-(glycidoxypropyl)methyidiethoxysilane,
 γ-(glycidoxypropyl)dimethylethoxysilane,
 γ-(glycidoxypropyl)diisopropylethoxysilane, and
 γ-(glycidoxypropyl)bis(trimethylsiloxy) methylsilane.

The preferred epoxyalkoxysilane is γ-(glycidoxypropyl)trimethoxysilane.

The unsaturated alkoxysilane can be a vinylsilane, an allylsilane, an acrylic silane or a methacrylic silane.

Examples of vinylsilanes are vinyltris(2-methoxyethoxy) silane, vinyltrisisobutoxysilane, vinyltri-t-butoxysilane, vinyltriphenoxysilane, vinyltrimethoxysilane, vinyltriisopropoxysilane, vinyltriethoxysilane, vinyltriacetoxysilane, vinylmethyldiethoxysilane, vinylmethyldiacetoxysilane, vinylbis(trimethylsiloxy)silane and vinyldimethoxyethoxysilane.

Examples of allylsilanes are allyltrimethoxysilane, alkyltriethoxysilane and allyltris (trimethylsiloxy)silane.

Examples of acrylic silanes are:
3-acryloxypropyltris (trimethylsiloxy)silane,
3-acryloxypropyltrimethoxysilane,
3-acryloxypropylmethyldimethoxysilane,
3-acryloxypropylmethylbis(trimethylsiloxy)silane,
3-acryloxypropyidimethylmethoxysilane, n-(3-acryloxy-2-hydroxypropyl)-3-aminopropyltriethoxysilane.

Examples of methacrylic silanes are:
3-methacryloxypropyltris (vinyldimethoxylsiloxy)silane,
3-methacryloxypropyltris (trimethylsiloxy) silane,
3-methacryloxypropyltris(methoxyethoxy)silane,
3-methacrylo-xypropyltrimethoxysilane,
3-methacryloxypropylpentamethyl disiloxane,
3-methacryloxypropylmethyldimethoxysilane,
3-methacryloxypropylmethyl-diethoxysilane,
3-methacryloxypropyldimethyl methoxysilane,
3-methacryloxypropyidimethylethoxysilane,
3-methacryloxypropenyltrime-thoxysilane, and
3-methacryloxypropylbis (trimethylsiloxy)methylsilane.

The preferred silane is acryloxypropyltrimethoxysilane.

Preferably, the amounts of epoxyalkoxysilane(s) and unsaturated alkoxysilane(s) used for the coupling agent preparation are such that the weight ratio $$R = \frac{\text{weight of epoxyalkoxysilane}}{\text{weight of unsaturated alkoxysilane}}$$

verifies the condition $0.8 \leq R \leq 1.2$.

The coupling agent preferably comprises at least 50% by weight of solid material from the epoxyalkoxysilane(s) and unsaturated alkoxysilane(s) and more preferably at least 60% by weight.

The coupling agent preferably comprises less than 40% by weight of liquid water and/or organic solvent, more preferably less than 35% by weight.

The expression "weight of solid material from epoxyalkoxy silanes and unsaturated alkoxysilanes" means the theoretical dry extract from those silanes which is the calculated weight of unit $Q_k Si O_{(4-k)/2}$ where Q is the organic group that bears the epoxy or unsaturated group and $Q_k Si O_{(4-k)/2}$ comes from $Q_k Si R'O_{(4-k)}$ where Si R' reacts to form Si OH on hydrolysis.

k is an integer from 1 to 3 and is preferably equal to 1.

R' is preferably an alkoxy group such as $OCH_3$.

The water and organic solvents referred to above come from those which have been initially added in the coupling agent composition and the water and alcohol resulting from the hydrolysis and condensation of the alkoxysilanes present in the coupling agent composition.

Preferred preparation methods for the coupling agent comprises:
1) mixing the alkoxysilanes
2) hydrolyzing the alkoxysilanes, preferably by addition of an acid, such a hydrochloric acid
3) stirring the mixture
4) optionally adding an organic solvent
5) adding one or several catalyst(s) such as aluminum acetylocetonate
6) Stirring (typical duration: overnight).

Typically the amount of coupling agent introduced in the scratch-resistant coating composition represents 0.1 to 15% by weight of the total composition weight, preferably 1 to 10% by weight.

The abrasion and/or scratch-resistant coating composition can be applied on the anti-reflecting coating using any classical method such as spin, dip or flow coating.

The abrasion and/or scratch-resistant coating composition can be simply dried or optionally precured before application of the subsequent impact-resistant primer coating (which may be the dry latex layer) or implementation of the process of the invention. Depending upon the nature of the abrasion and/or scratch-resistant coating composition thermal curing, UV-curing or a combination of both can be used.

Thickness of the abrasion and/or scratch-resistant coating, after curing, usually ranges from 1 to 15 μm, preferably from 2 to 6 μm.

Before applying the impact resistant primer on the scratch-resistant coating, it is possible to subject the surface of the scratch-resistant coating to a corona treatment or a vacuum plasma treatment, in order to increase adhesion.

The impact-resistant primer coating can be any coating typically used for improving impact resistance of a finished optical article. Also, this coating generally enhances adhesion of the scratch-resistant coating on the substrate of the finished optical article.

By definition, an impact-resistant primer coating is a coating which improves the impact resistance of the finished optical article as compared with the same optical article but without the impact-resistant primer coating.

Typical impact-resistance primer coatings are (meth)acrylic based coatings and polyurethane based coatings.

(Meth)acrylic based impact-resistant coatings are, among others, disclosed in U.S. Pat. Nos. 5,015,523, 6,503,631 whereas thermoplastic and cross linked based polyurethane resin coatings are disclosed inter alia, in Japanese Patents 63-141001 and 63-87223, EP 0404111 and U.S. Pat. No. 5,316,791.

In particular, the impact-resistant primer coating according to the invention can be made from a latex composition such as a poly(meth)acrylic latex, a polyurethane latex or a polyester latex.

Among the preferred (meth)acrylic based impact-resistant primer coating compositions there can be cited polyethyleneglycol(meth)acrylate based compositions such as, for example, tetraethyleneglycoldiacrylate, polyethyleneglycol (200) diacrylate, polyethyleneglycol (400) diacrylate, polyethyleneglycol (600) di(meth)acrylate, as well as urethane (meth)acrylates and mixtures thereof.

Preferably the impact-resistant primer coating has a glass transition temperature (Tg) of less than 30° C.

Among the preferred impact-resistant primer coating compositions, there may be cited the acrylic latex commercialized under the name Acrylic latex A-639 commercialized by Zeneca and polyurethane latex commercialized under the names W213, W-240 and W-234 by Baxenden.

In a preferred embodiment, the impact-resistant primer coating may also include an effective amount of a coupling agent in order to promote adhesion of the primer coating to the optical substrate and/or to the scratch-resistant coating.

The same coupling agents, in the same amounts, as for the scratch-resistant coating compositions can be used with the impact-resistant coating compositions.

The impact-resistant primer coating composition can be applied on the scratch-resistant coating using any classical method such as spin, dip, or flow coating.

The impact-resistant primer coating composition can be simply dried or optionally precured before molding of the optical substrate.

Depending upon the nature of the impact-resistant primer coating composition, thermal curing, UV-curing or a combination of both can be used.

Thickness of the impact-resistant primer coating, after curing, typically ranges from 0.05 to 30 µm, preferably 0.5 to 20 µm and more particularly from 0.6 to 15 µm, and even better 0.6 to 2 µm.

When the flexible carrier of the coated film is intended to be withdrawn at the completion of the process the face of film bearing the coating or coating stack may be first coated with a protecting and releasing coating which acts to protect the film face and has to be removed before implementing the process of the invention.

The applied films may also be uncoated films such as polarized films, colored films, photochromic films, electric-photochromic films and printed films, preferably polarized films, colored films and photochromic films, or combinations of these films, microstructured or logo film. The thickness of the films could be from 0.3 to 1.5 mm.

The force applied to the coated or uncoated film of the inventive process may be obtained by applying pressure in particular air pressure or vacuum to the film. Typically the applied pressure will range from 0.35 to 3.5 $kg/cm^2$ (5 to 50 psi), preferably 0.3 to 3 $kg/cm^2$ and better 0.35 to 1.40 $kg/cm^2$ (5 to 20 psi).

When vacuum is used for creating the application force, the typically applied force may be around 130 Newtons.

Pressure may be applied using an inflatable membrane apparatus as disclosed in international patent application WO 03/004255.

Figure 1B:
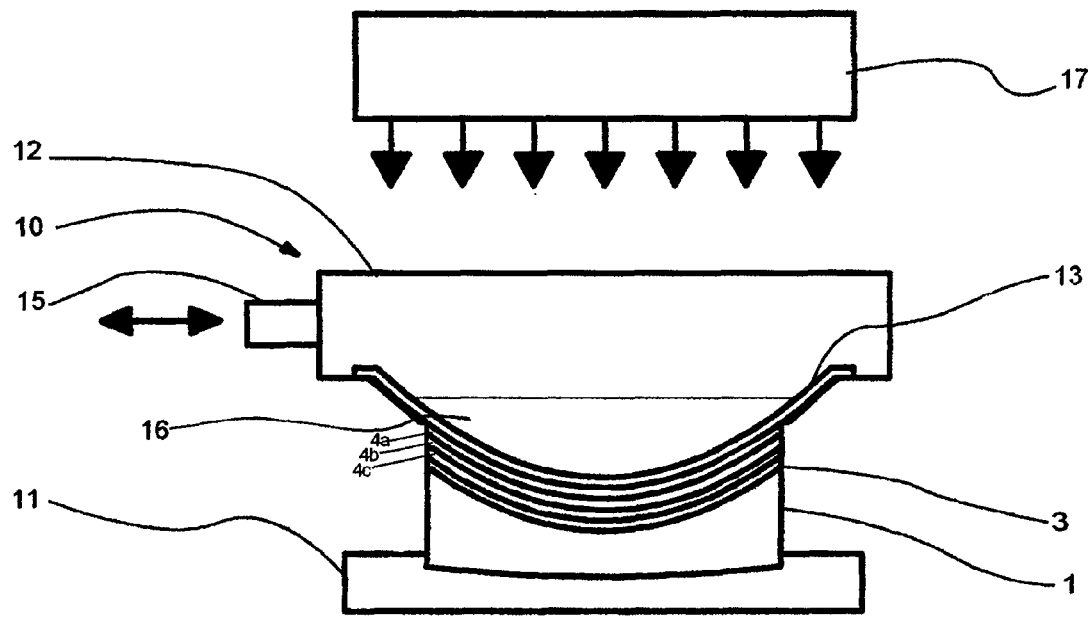

Referring now to the drawings and in particular to FIGS. 1A and 1B, there are shown main steps of an embodiment of the process of the invention, using an inflatable membrane apparatus and, as heat activable adhesive a dry latex layer wetted by a water base activating liquid. Of course, a heat curable adhesive could have been used instead of the dry latex layer A lens substrate 1 having a concave surface 2 is placed on a supporting element 11 (of an inflatable membrane apparatus 10) with its concave (rear) surface 2 facing upwardly towards the inflatable membrane 13 of the apparatus 10 and in register therewith. As shown in FIGS. 1A and 1B, the inflatable membrane apparatus comprises a pressurized fluid accumulator 12 having its bottom wall formed partly by the inflatable membrane 13.

Pressurized fluid is introduced or released from the pressurized fluid accumulator 12 by means of an admission/release device 15. Inflation of the inflatable membrane 13 is guided by a trunconical guide part 14. A microwave heatable liquid 16, such as ethyleneglycol, is in contact with the inflatable membrane 13 within the accumulator 12. A pre-measured drop of a water base activating liquid 3, for example deionized water, is then deposited onto the surface 2 of the lens substrate 1. A coated film 4 comprising a removable flexible carrier 4a which has been previously coated on one face with a prescribed coating or coating stack 4b and a dry latex layer 4c, is placed over the lens substrate with the dry latex layer facing the lens substrate.

Deposition of coating or coating stack 4b and dry latex layer 4c on the surface of the flexible carrier 4a can be done through any usual deposition process employed in the optical field, such as vacuum deposition, spin coating, flow coating, dip coating etc. . . . Of course, the deposition process will depend on the nature of the coating layer or layers and of the latex layer deposited on the surface of the flexible carrier 4a.

Thereafter pressurized fluid is introduced into the accumulator 12 to inflate the membrane 13 which in turn exerts a pressure onto the coated film in such a manner that the drop 3 will spread between the surface 2 of the lens substrate 1 and the dry latex layer 4c forming a pellicle wetting the dry latex layer and the film 4 conforms to the shape of the surface 2 of the lens substrate 1.

While maintaining the pressure, the whole system comprising the inflatable membrane apparatus 10, the lens substrate 1 and the film 4 is subjected to microwave from a microwave source 17 (FIG. 1B) to heat the microwave heatable liquid 16 and by conduction the dry latex layer and the pellicle of water base activating liquid.

Thereafter, the microwave source 17 is turned off and the pressure is released to deflate the membrane 13 and the lens substrate 1 with the film 4 adhered thereon is recovered.

Figure 2A:
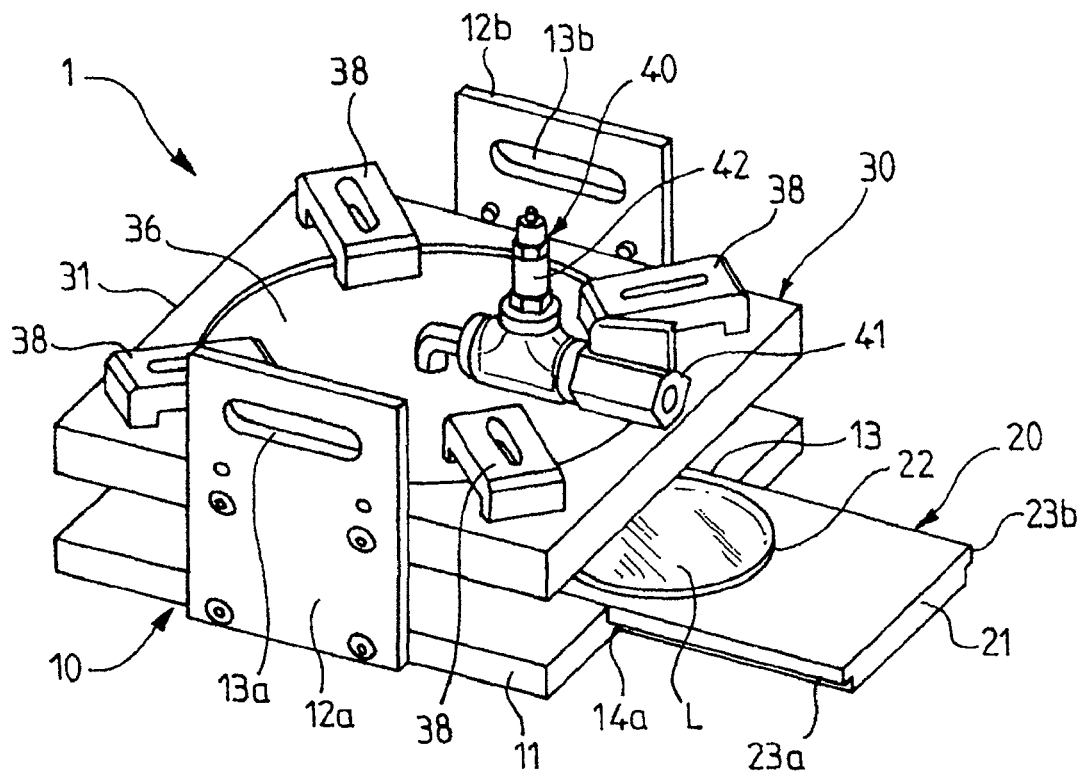
FIGS. 2A and 2B are a perspective view and a cross-sectional view, respectively, of an inflatable membrane apparatus.
Figure 2B:
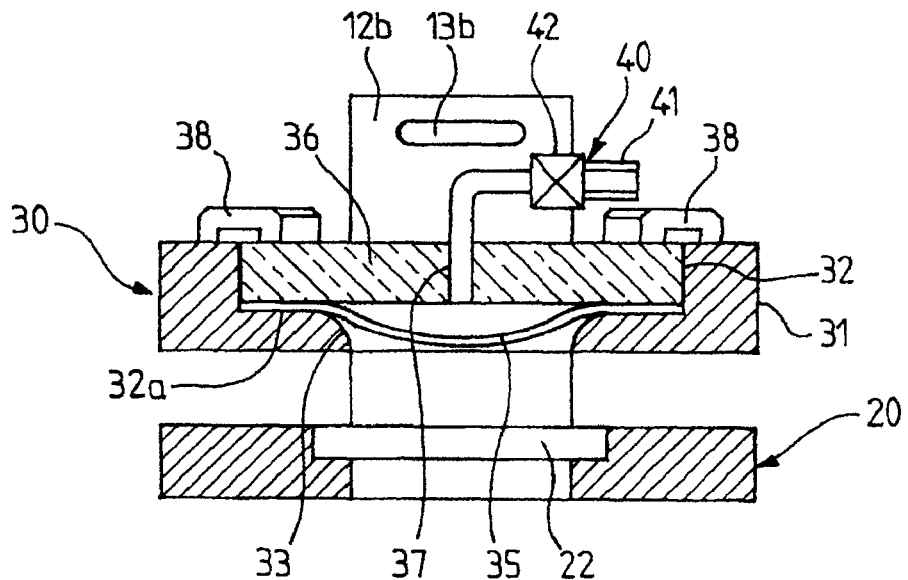

Referring to FIGS. 2A and 2B, there is shown an embodiment of an inflatable membrane apparatus that can be used to implement the process of the invention.

Referring to FIG. 2A, there is represented in perspective an embodiment of an inflatable membrane pressing apparatus 1 according to the invention. The pressing apparatus 1 comprises a holding frame 10, an optical article supporting means 20, an inflatable membrane device 30 and a pressurized fluid admission/release means 40.

The holding frame 10 comprises a horizontal base plate 11, typically of a square parallelepipedic shape, and two, parallel, upright standing flanges 12a, 12b.

Each flange 12a, 12b is fixed at its lower end, for example by means of screws, to a lateral side of the base plate 11, these lateral sides of the base plate 11 being opposite sides thereof. Flanges 12a, 12b are also provided at their upper ends with horizontal elongated apertures 13a, 13b for allowing easy transportation of the pressing apparatus 1.

For sake of clarity, the direction parallel to the flanges 12a, 12b will be designated as the longitudinal direction and conversely the direction orthogonal to the flanges 12a, 12b will be designated as the transversal direction.

The base plate 11 comprises a central longitudinal recess 13 of rectangular shape for slidably accommodating the optical article supporting means 20.

The optical article supporting means 20 is comprised of a rectangular plate 21 sized to be accommodated within longitudinal recess 13 of base plate 11. Rectangular plate 21 is provided with a central circular aperture 22 for receiving an optical article such as ophthalmic lens L.

The longitudinal sides of rectangular plate 21 are provided with slides 23a, 23b which cooperate with sliding guides formed on the longitudinal sides of rectangular recess 13, only one sliding guide 14a, being visible in FIG. 2A.

The inflatable membrane device 30, which is of general same square parallelepipedic shape and size than base plate 11, is fixed to flanges 13a, 13b by its opposite longitudinal sides, for example by means of screws, in a spaced apart relationship above base plate 11, parallel to base plate 11, and with inflatable membrane 35 facing base plate 11.

As shown in schematic cross-sectional view of FIG. 2B the inflatable membrane device 30 comprises a body 31 with a central cylindrical upper cavity 32 opening in the upper face of the body 31 and whose bottom surface is defined by an annular rim 32a. Upper cavity 32, at its bottom surface communicates with a central trunconical aperture 33 which opens in the lower face of body 31 and as will be explained below acts as a guiding means for the inflatable membrane 35.

The inflatable membrane 35, of circular shape, rests at its periphery on annular rim 32a and covers central trunconical aperture 33.

A circular removable cover 36 is placed above the inflatable membrane 35 in cylindrical upper cavity 32 and is firmly maintained in position by means of latching means 38, such as pivoting or retractable cleats.

Thus, inflatable membrane 35 is pinched at its periphery between annular rim 32a and removable cover 36.

Such an assembly allows easy replacement of the inflatable membrane 35.

Removable cover 36 is provided with a passage 37 for admission/release of a pressurized fluid such as pressurized air behind the inflatable membrane 35.

Body 31, inflatable membrane 35 and removable cover 36 constitute what is called a fluid accumulator.

Passage 37, as shown in FIG. 2B, opens at top and bottom surfaces of cover 36.

Passage 37, is connected to a pressurized fluid admission/release means 40 which comprises in flow communication a pressure relief valve 42 and, upstream of the pressure relief valve 42 with regard to a pressurized fluid source, a fluid in/out valve 41 that is removably connectable to the source of pressurized fluid, for example pressurized air, not shown in the drawings.

The truncomical aperture 33 typically has a height of 10 to 50 mm, preferably 10 to 25 mm and an outwardly oriented taper of 10° to 90°, preferably 30° to 50°.

The cover 36 can be made of a microwave transparent material, or include a microwave transparent window.

The inflatable membrane 35 can be made of any elastomeric material which can be sufficiently deformed by pressurization with an appropriate fluid. Typically, the inflatable membrane has a thickness ranging from 0.50 mm to 5.0 mm and an elongation of 100 to 800%, and a durometer 10 to 100 shore A.

Figure 3:
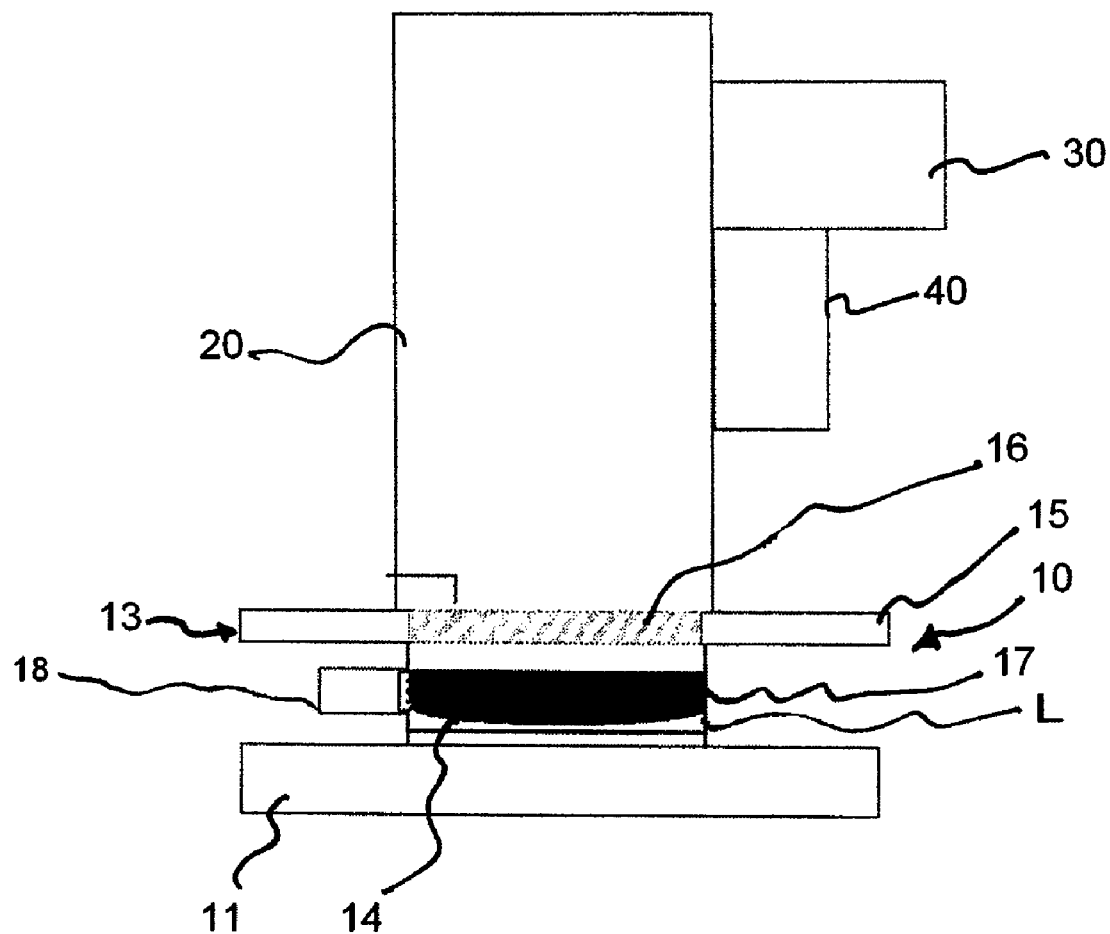
FIG. 3 is a schematic view of a preferred embodiment of a system according to the invention, avoiding the use of a microwave oven.

In a preferred embodiment, the inflatable membrane pressing apparatus, as shown in FIG. 3, is modified so that the internal space of the pressurized fluid accumulator, including the carrier/film/lens substrate assembly, acts as a microwave cavity. In that case, the whole system comprises an inflatable membrane pressure apparatus 10 coupled to a waveguide 20 and a microwave source 30.

More specifically, the inflatable membrane apparatus 10 comprises a lens substrate support 11 for holding a lens substrate L and the coated or uncoated film to be applied, a pressurized fluid accumulator 13 comprising a bottom wall partly formed by an inflatable membrane and a top wall 15 comprising a microwave transparent window 16. A waveguide 20, for example a short metal tube, is coupled at a first end with the microwave transparent window 16 whereas a second end of the waveguide 20 is coupled to a microwave energy source 30, for example a magnetron. As shown in FIG. 3, the pressurized fluid accumulator contains a microwave heatable liquid 17, however any previously described form of a microwave heatable material can be used with the system of FIG. 3. Finally, a temperature sensor 18, such as an IR sensor can be provided and coupled with the electrical supply and electronic control device 40 of the magnetron to control heating step during the application process. The waveguide directs the microwave energy from the magnetron into the accumulator, where it heats the enclosed fluid. With such a system, the inflatable membrane apparatus needs not to be made of non microwave heatable material parts and can be made of metal parts without any risk of heating the metal parts during the heating step.

The following examples illustrate the present invention.

In examples 1 to 5, the coated film comprises a polycarbonate (PC) carrier bearing on its convex surface a coating stack including, starting from the carrier a hydrophobic top coat, an anti-reflective coating and an abrasion and/or scratch-resistant coating.

A dry latex layer is formed on the abrasion and/or scratch-resistant coating.

The assembly of the coating stack and the dry latex coating is called the HMC coating.

Step 1: Protecting and Releasing Coating

The composition of the protecting and releasing coating was as follows:

| Component | Parts by weight |
| --- | --- |
| PETA LQ (acrylic ester of pentaerythritol) | 5.00 |
| Dowanol PnP | 5.00 |
| Dowanol PM | 5.00 |
| n-propanol | 5.00 |
| 1360 (Silicone Hexa-acrylate, Radcure) | 0.10 |
| Coat-O-Sil 3503 (reactive flow additive) | 0.06 |
| Photoinitiator | 0.20 |

The PC carrier is cleaned using soapy water and dried with compressed air. The carrier convex surface is then coated with the above protecting coating composition via spin coating with application speed of 600 rpm for 3 seconds and dry speed of 1200 rpm for 6 seconds. The coating is cured using Fusion System H+ bulb at a rate of 1.524 m/minute (5 feet per minute).

Step 2: Hydrophobic Top Coat and Anti-Reflective (AR) Coating

The PC carrier after deposition of the protecting coating is vacuum coated as follows:

A/ Standard Vacuum AR Treatment: The Vacuum AR treatment is accomplished in a standard box coater using well known vacuum evaporation practices. The following is one procedure for obtaining the VAR on the mold:
1. The carrier having the protective coating already applied on the surface is loaded into a standard box coater and the chamber is pumped to a high vacuum level.
2. Hydrophobic coating (Chemical=Shin Etsu KP801M) is deposited onto the surface of the carrier using a thermal evaporation technique, to a thickness in the range of 2-15 nm.
3. The dielectric multilayer AR coating, consisting of a stack of sublayers of high and low refractive index materials is then deposited, in reverse of the normal order. Details of this deposition are as such:

The optical thicknesses of the alternating low and high refractive index layers are presented in the table (They are deposited in the indicated order, from the mold surface):

| | |
|---|---|
| Low index | 103-162 nm |
| High index | 124-190 nm |
| Low index | 19-37 nm |
| High index | 37-74 nm |

A preferred stack is a stack wherein the low index material is $SiO_2$ and the high index material is $ZrO_2$.

B/ At the completion of the deposition of the four-layer anti-reflection stack, a thin layer of $SiO_2$, comprising of a physical thickness of 1-50 nm, is deposited. This layer is to promote adhesion between the oxide anti-reflection stack and a lacquer hard-coating which will be deposited on the coated mold at a later time.

Step 3: Deposition of Hard Coat (HC)

The composition of the hard coating is as follows:

| Component | Parts by weight |
|---|---|
| Glymo | 21.42 |
| 0.1N HCl | 4.89 |
| Colloidal silica | 30.50 |
| Methanol | 29.90 |
| Diacetone alcohol | 3.24 |
| Aluminum acetylacetonate | 0.45 |
| Coupling agent | 9.00 |
| Surfactant FC-430 (3M company) | 0.60 |

The composition of the primer is as follows:

| Component | Parts by weight |
|---|---|
| Polyurethane latex W-234 | 35.0 |
| Deionized water | 50.0 |
| 2-Butoxy ethanol | 15.0 |
| Coupling agent | 5.00 |

The PC carrier after deposition of protecting coating and AR coating in Steps 1 and 2 is then spin coated by HC solution at 600 rpm/1200 rpm, and precured 10 minutes at 80° C., and again spin coated by latex primer solution at the same speed and postcured for 1 hour at 80° C.

The coupling agent is a precondensed solution of:

| Component | Parts by weight |
|---|---|
| GLYMO (Glycidoxypropyltrimethoxysilane) | 10 |
| Acryloxypropyltrimethoxysilane | 10 |
| 0.1 N HCl | 0.5 |
| Aluminum acetylacetonate | 0.5 |
| Diacetone alcohol | 1.0 |

Testing and Inspection Procedures

Dry adhesion is measured using the cross-hatch adhesion test according to ISTM 02010, using 3M SCOTCH® n°600 transparent tape.

25 squares are formed.

Adhesion is rated as follows:

| Adhesion score | Squares removed | Area % left intact |
|---|---|---|
| 0 | 0 | 100 |
| 1 | <1 | 96 |
| 2 | 1 to 4 | 96-84 |
| 3 | >4 to 9 | 83-64 |
| 4 | >9 to 16 | 63-36 |
| 5 | >16 | <36 |

Wet adhesion test: same test method as dry adhesion test except the sample is boiling in hot water at 100° C. for 30 minutes before implementing the test.

Carrier Preparation 0.5 mm PC carrier made by injection with 5.8 and 6.4 base is coated on their convex surface with HMC coating as disclosed above.

Lens Preparation

Lenses are corona discharge treated using 3DT equipment. The lenses go in front of the discharge head at a speed of 17 mm/s. There is 4 passes with a 5 s delay between each pass. Then, the lens is lowered down in order to treat its upper part and goes through another set of 4 passes with 5 s delays in between at a speed of 17 mm/s.

Corona power is applied under 15 000 to 20 000 volts.

Determination of the "tacky" temperature of the dry latex layer.

Basically, the test for measuring the "tacky" temperature consists in repeatedly moving down a probe so that a flat end of the probe touches the latex layer under a specified pressure (positive force) and lifting off the probe from the latex layer under a specified force (negative force) while the layer is subjected to a programmed temperature increase. The "tacky" temperature is the temperature at which the probe sticks to the layer and is no longer able to be lifted off from the sample.

Figure 4:
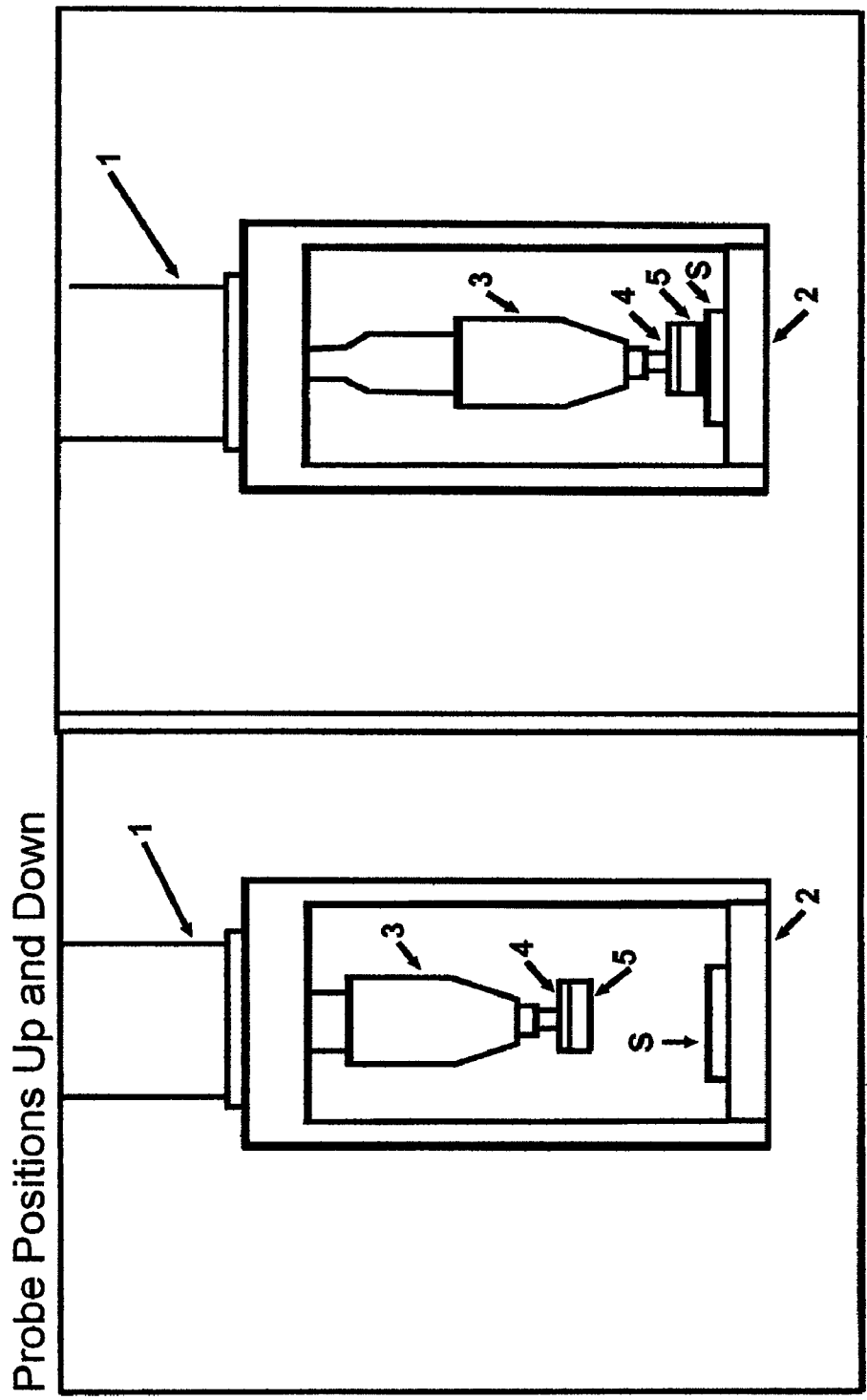
FIG. 4 are schematic views of the apparatus for measuring the "tacky" temperature with the probe in up and down positions.

The "tacky" temperature is measured using a Perking Elmer Dynamic Mechanical Analyser, schematically represented in FIG. 4, working in creep-recovery mode. A creep-recovery test is a test in which a constant load is applied for a specified duration of time on the sample and dimensional distortion is monitored. Then the load is released (but still having enough force to stay in contact with the sample) and the recovering ability of the material is monitored. However, in the measurement of the "tacky" temperature the Perkin Elmer DMA is used in a somewhat unconventional way in the "creep-recovery mode".

More specifically, the latex composition is spin coated on a flat polycarbonate sheet and dried at 85° C. for 15 minutes. Small rectangular samples (1.5 cm×0.5 cm) are cut from the PC sheet. For each kind of dry latex layers two samples are tested. If repeatable temperature is not obtained with two samples, more samples are tested until repeatable data is obtained. Typically the dried latex layer, for this test, has a thickness of 4 to 7 μm.

Referring to FIG. 4, the sample S is secured on the supporting plate 2 of the analyzer 1, with the latex layer facing the probe 3, using a double sided adhesive tape.

A generic differential scanning calorimetry pan 5 (typically 6.7 mm conventional aluminum DSC pan) is placed over the flat tip 4 of the probe.

Figure 5:
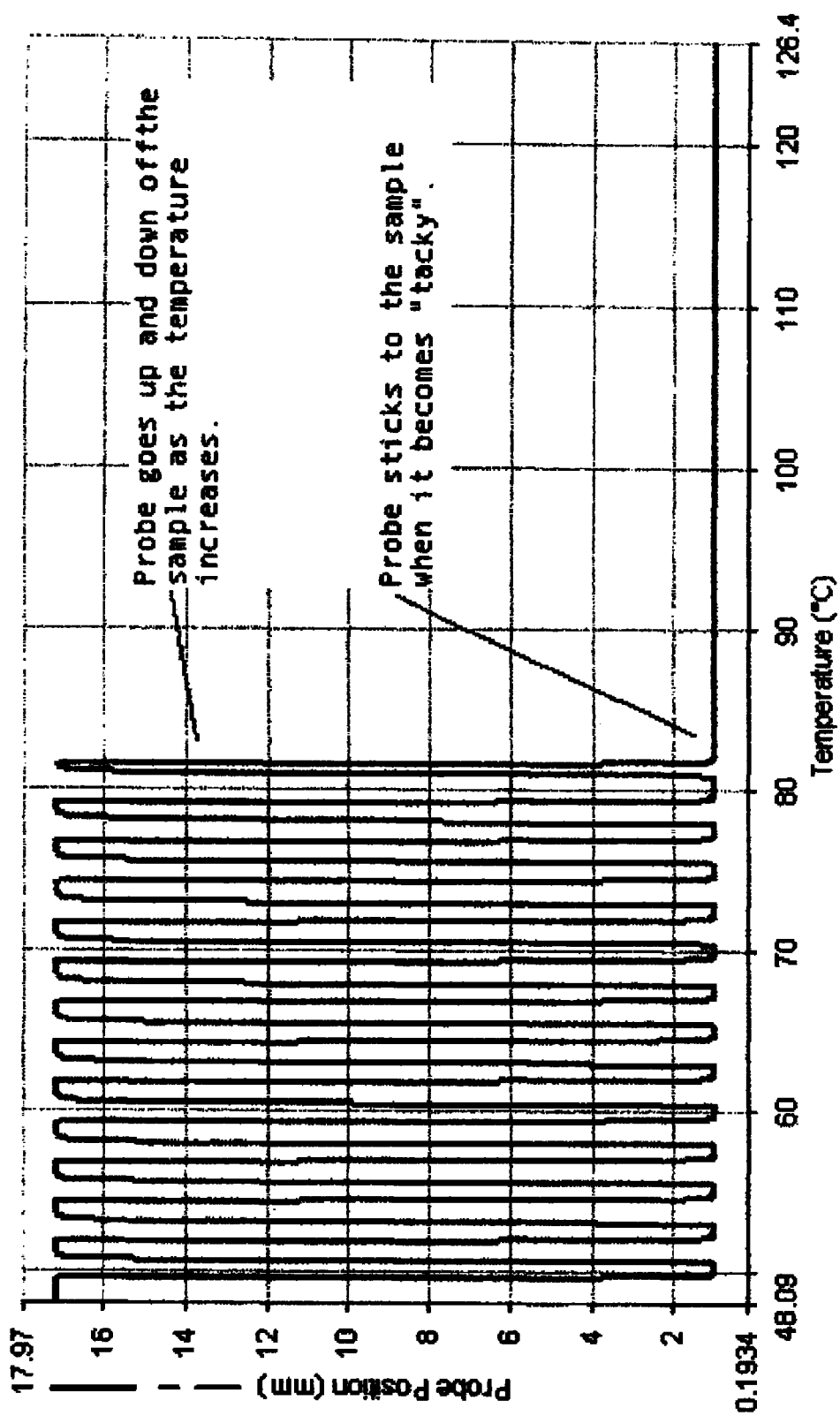
FIG. 5 is an exemplary graph of a registration for measuring the "tacky" temperature.

The probe is moved down into contact with the latex layer and lifted off the layer under specified conditions while the temperature of the DSC pan is increased according to a program until the probe sticks to the layer. Movement of the probe during temperature increase is registered as shown in FIG. 5. The "tacky" temperature is the temperature at which the probe sticks to the layer.

The following parameters have been used for measuring the "tacky" temperature.

Perkin Elmer DMA 7e Analyzer-Creep Recovery mode
Creep: 30 mN (positive force. Probe down), 0.5 minute;
Recovery: −25 mN (Negative force. Probe up), 0.5 minute;
Parallel Plates diameters.
Top probe plate 5 mm/with DSC pan 6.7 mm
Bottom plate (support) 20 mm
Heat program: 50-100° C. at 2.5° C./minute
Nitrogen Purge/Intracooler 1

"Tacky" temperatures for some dry latex layers are given in Table 3 below.

| Latex layer | Thickness of latex layer (μm) | "Tacky" temperature (° C.) |
|---|---|---|
| Witcobond W 213 | 3.9-4.0 | 90-93 |
| Witcobond W 234 with coupling agent | 4.9-5.2 | 61 |
| Witcobond W 240 | 4.45 | 112-117 |
| Witcobond W 234 without coupling agent | 6.2-7.3 | 49-54 |

EXAMPLES 1 TO 6

Equipment

Microwave source: Sharp half-pint consumer grade microwave oven (approx. 500 W)
IR thermometer: Raytek MID series IR thermometer; 10:1 optical resolution; emissivity=0.95.
Temp. controller: Omega CN3000 controller, on/off mode.
Air pressure regulation: PLC controlled servo pressure regulator (Marsh Bellofram 3110).

Example 1

To fully support the test lens, a 5 mm thick polycarbonate lens support was placed concave side up on the removable lens holder of the inflatable membrane apparatus. The concave surface curvature of the lens support matched the convex surface curvature of the test lens. A piece of silicon membrane (1-2 mm thick) was then placed on top of the lens support. The test lens (−2,00 D, polycarbonate, 71 mm diameter) with an anti-reflecting inorganic multilayer coating on the front (convex) side was then placed concave side up on the lens support/silicon membrane. Four drops of deionized water were placed on the concave lens surface, and then a 5.8 base HMC carrier (73 mm diam.; convex side down) was gently placed on top of the lens. The lens/carrier assembly was then placed beneath the inflatable membrane of the accumulator, which internally contained approximately 60 ml of propylene glycol. The accumulator was pressurized to 20 psig (1.40 kgf/cm$^2$) over two minutes. The pressurized accumulator was then placed inside the microwave oven cavity. The propylene glycol was heated via microwave energy to a temperature of 100° C. The temperature was maintained at 100° C. for 6 minutes by monitoring the fluid temperature with an infrared thermometer. The IR thermometer was coupled to a temperature controller, which turned power on or off to the microwave oven, depending on the fluid temperature.

After six minutes, the accumulator was depressurized and the lens/carrier assembly removed. After cooling to room temperature (approx. 5 minutes), the lens was edged and the carrier removed, resulting in an optically clear, coated lens. The AR coatings on the front side and the back side did not have any cracking or crazing. Crosshatch adhesion testing of the back-side coating showed good adhesion. No optical distortion was observed (front side measured curve: 4.24 D before; 4.26 D after)

Example 2

Example 1 was repeated, except that the lens support was not used. Crazing and radial cracking of the front-side AR stack was noted after edging and carrier removal. Crosshatch adhesion testing showed good adhesion of the back-side coating. No optical distortion was observed, but the front side measured curve was changed (before: 4.23 D; after 4.79 D)

Example 3

Example 1 was repeated, except that the lens used was a corona treated lens made of diethyleneglycol bis-allylcarbonate copolymer CR-39® from PPG (−1.00 D, 71 mm diam., same AR inorganic multilayer stack on front-side), and the temperature setpoint was 85° C. The resulting lens was optically clear, with transferred coating. Both front-side and back-side AR coatings showed no sign of crazing or radial cracking. Crosshatch adhesion tests showed good adhesion of the back-side coating stack. No optical deformation was observed (front-side measured curve before: 6.19 D; after 6.20 D)

Example 4

Example 3 was repeated, except that the CR-39® lens used was not corona treated prior to the process. The resulting lens was optically clear, with transferred coating. Front-side AR coating stack showed no signs of cracking or crazing. Crosshatch adhesion testing showed lesser adhesion of the back-side coating stack.

Example 5

Example 3 was repeated, except that the CR-39® lens used was not corona treated prior to the process, and four drops of Witco W-234 latex (50 wt % in water; 15 wt % total solids) was used instead of pure water. The resulting lens was optically clear, with transferred coating. Front-side and back-side AR coatings were not crazed or cracked, and crosshatch adhesion testing showed good adhesion of the back-side coating stack. No optical deformations were observed, Example 6

Example 1 was repeated, except that the lens used was a corona treated Thin-and-Lite® (polythiourethane) 1.67 index lens (−1.25 D, 71 mm diam.), and the temperature setpoint was 75° C. The resulting lens was optically clear, with transferred coating. Crosshatch adhesion testing showed good adhesion of the back-side coating stack. No optical deformations were observed (front-side measured curve before: 3.57 D; after 3.59 D).

The invention claimed is:

1. A process for applying under pressure a coated or uncoated film onto a main surface of a lens substrate comprising:
   (a) providing the coated or uncoated film;
   (b) providing the lens substrate;
   (c) forming between a face of the coated or uncoated film and a main surface of the lens substrate a layer of a heat activable adhesive;
   (d) applying a force on the coated or uncoated film to urge the coated or uncoated film against the lens substrate main surface, with the heat activable adhesive layer therebetween and to conform the coated or uncoated film to the shape of the lens substrate main surface;
   (e) while maintaining the applied force on the coated or uncoated film, heating the heat activable adhesive to promote adhesion between the coated or uncoated film and the lens substrate main surface;
   (f) stopping heating and releasing applied force; and
   (g) recovering the lens substrate with the coated or uncoated film adhered thereon;
   wherein, heating step (e) comprises applying a microwave energy to a microwave heatable material situated so that the heat activable adhesive layer is heated by conduction of the heat generated by the microwave heatable material, wherein the microwave heatable material is located between the coated or uncoated film and an inflatable membrane of an inflatable membrane apparatus, and further is in the form of a liquid in contact with the inflatable membrane which comes into contact with the coated or uncoated film during the process.

2. The process of claim 1, wherein microwave energy is applied with a microwave energy producing device comprising a waveguide coupled with a microwave source.

3. The process of claim 2, wherein the inflatable membrane apparatus comprises a pressurized fluid accumulator having opposite bottom and top walls, the bottom wall being partly formed by an inflatable membrane, the top wall of the pressurized fluid accumulator comprising a microwave transparent window in register with the inflatable membrane, and the microwave energy producing device comprises a waveguide coupled with said microwave transparent window and said microwave source.

4. The process of claim 1, wherein the coated or uncoated film is a coated film comprising a flexible carrier comprising one face bearing a coating or a stack of coatings and the process further comprises peeling off the carrier to recover the lens substrate with the coating or stack of coatings adhered thereon.

5. The process of claim 1, wherein the heat activable adhesive layer comprises a heat curable polymer composition or a dry latex layer wetted by a water base activating liquid.

6. The process of claim 1, wherein the microwave energy is applied with a microwave oven.

7. The process of claim 1, wherein the heat activable adhesive is a heat curable adhesive comprising a heat curable adhesive composition.

8. The process of claim 1, wherein the coated or uncoated film is applied on the rear side of the lens substrate.

* * * * *

UNITED STATES PATENT AND TRADEMARK OFFICE
CERTIFICATE OF CORRECTION

PATENT NO. : 7,892,387 B2  Page 1 of 1
APPLICATION NO. : 11/419400
DATED : February 22, 2011
INVENTOR(S) : Steven Weber It is certified that error appears in the above-identified patent and that said Letters Patent is hereby corrected as shown below:

In title page, item (73) Assignee, delete
"International Compagnie Generale d'Optique" and insert
--Essilor International Compagnie Generale d'Optique-- therefor.

In claim 6, column 24, line 23, delete "wherein the microwave" and insert --wherein microwave-- therefor.

Signed and Sealed this
Twenty-sixth Day of July, 2011

David J. Kappos
*Director of the United States Patent and Trademark Office*